Jan. 11, 1949.   H. V. ALLISON   2,459,122
ABRASIVE TUBE DRILL MEANS
Filed May 10, 1947   2 Sheets-Sheet 1

INVENTOR.
HUGH V. ALLISON
BY
John Hanrahan
ATTORNEY

Jan. 11, 1949. H. V. ALLISON 2,459,122
ABRASIVE TUBE DRILL MEANS
Filed May 10, 1947 2 Sheets-Sheet 2
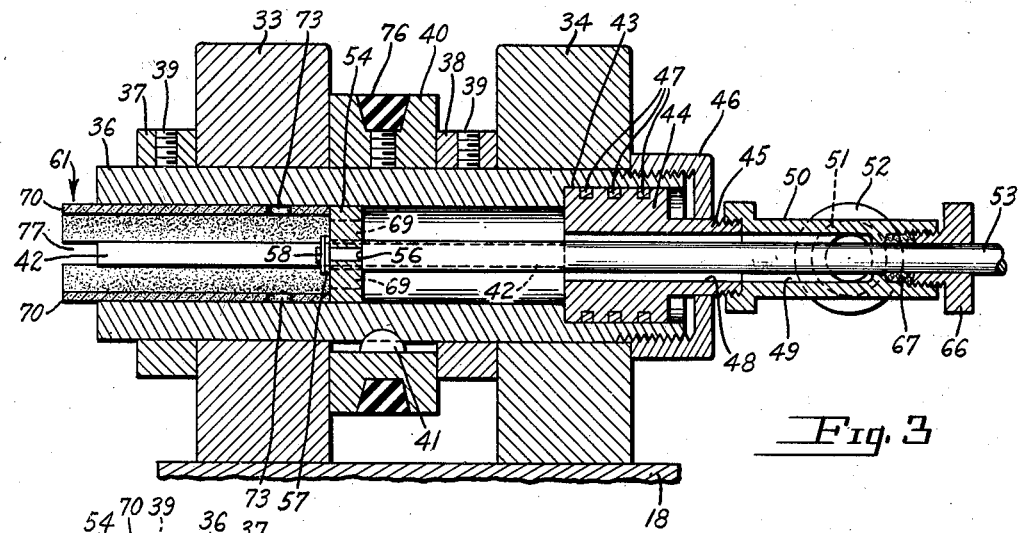
Fig. 3
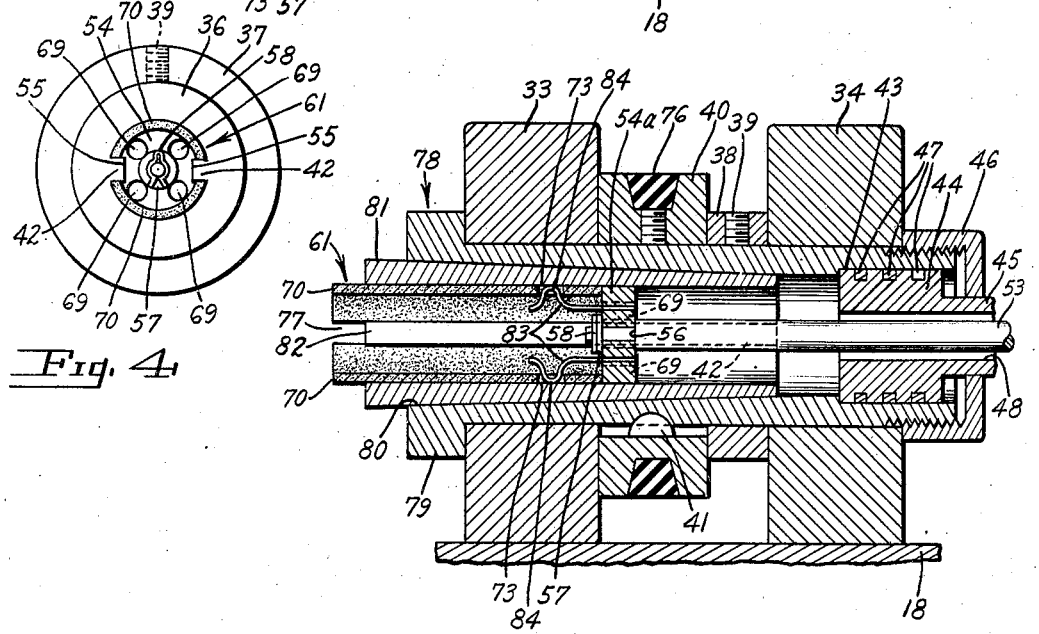
Fig. 4
Fig. 5
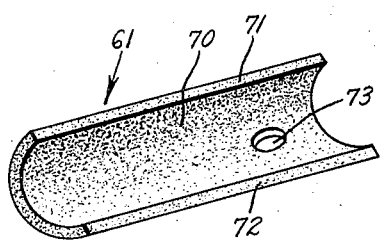
Fig. 6
INVENTOR.
HUGH V. ALLISON
BY
*Jokn J Hanrahan*
ATTORNEY Patented Jan. 11, 1949

2,459,122

UNITED STATES PATENT OFFICE 2,459,122

ABRASIVE TUBE DRILL MEANS

Hugh V. Allison, Fairfield, Conn., assignor to The Allison Company, Bridgeport, Conn., a corporation of Connecticut Application May 10, 1947, Serial No. 747,292

17 Claims. (Cl. 125—20)

This invention relates to new and useful improvements in abrasive cutting and has particular relation to the abrasive cutting of discs from plates or sheets of glass or other material.

An object of the invention is to provide a means for rapidly drilling or cutting discs from plates or sheets of glass or the like.

Another object is to provide an improved structure of abrasive drill and an improved structure of chuck for mounting the drill.

Another object is to provide an improved machine for using the mentioned abrasive tube drill and chuck including means for rotating the chuck and drill, means for supplying a coolant through the chuck and drill and means for advancing the drill through the chuck to and through the work.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 3 is a central longitudinal sectional view through the chuck, chuck mounting and the abrasive drill, the view being on a larger scale;

Fig. 4 is an end elevational view of the chuck, drill and a collar mounted on the chuck;

Fig. 5 is a view similar to Fig. 3 but showing a modification; and

Fig. 6 is an isometric view of a section of my new abrasive tube drill, although as will later be pointed out, this "section" may itself comprise the drill.

Figure 1:
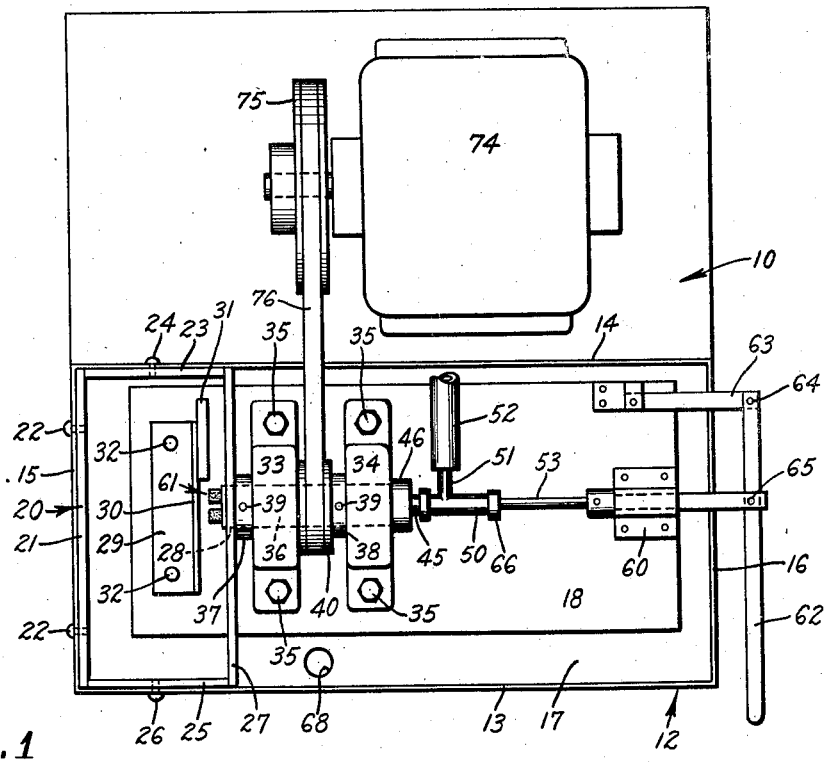
Fig. 1 is a top plan view of an abrasive drilling means made in accordance with the invention.
Figure 2:
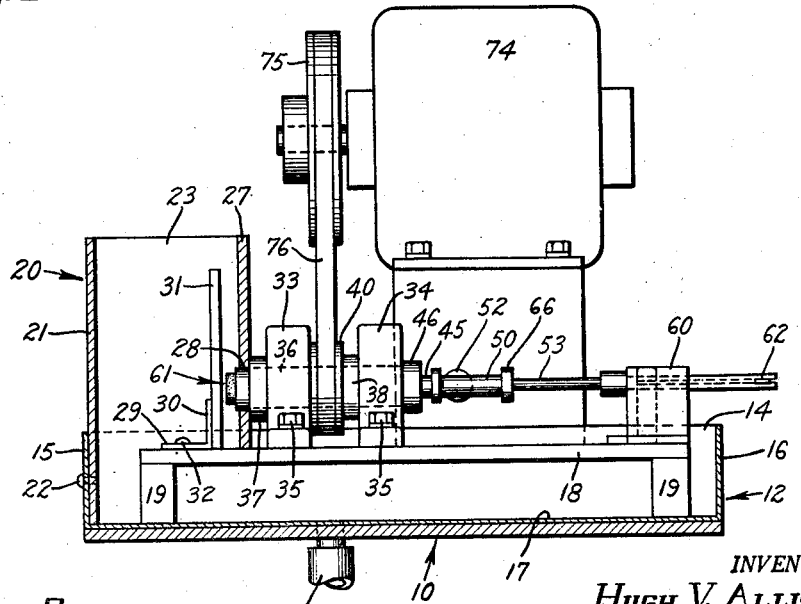
Fig. 2 is a front elevational view thereof with a portion of the base and of the work housing cut away.

Referring in detail to the drawings, at 10 is generally indicated a bed of a machine, the same being mounted on any suitable supports (not shown). On the forward portion of this bed is a trough-like structure generally designated 12 including front and rear walls 13 and 14 and side or end walls 15 and 16, in addition to a bottom wall 17. As shown, though 12 is generally rectangular and receives a base or support 18 shown as mounted on short legs or uprights 19 and occupying a substantial portion of the bottom or floor 17 of the trough.

In one end of the trough, a box structure 20 receives a portion of the work support 18 and this box structure comprises an outer wall 21 secured as by screws 22 to the trough wall 15, a rear wall 23 secured to the rear wall 14 of the trough as by screws 24, a front wall 25 secured to the front wall 13 of the trough as by screws 26 and an inner wall 27 fastened in any suitable manner (not shown) as for example, to the edge portions of the walls 23 and 25, respectively. This wall 27 is shorter than the walls 21, 23 and 25 and has its lower end disposed against the upper surface of the support 18 and toward such lower end is provided with an opening 28, the purpose of which will be set forth.

An angle bar 29 is secured against the upper side of the support 18 within the box 20 and the vertical arm 30 of this angle bar forms a holder against which work 31 may be clamped in any suitable manner (not shown). As here illustrated, the angle bracket is secured against the support 18 by screws or the like 32.

On the upper side of the support 18, inwardly of the wall 27 of the box 20, are mounted a pair of bearings or bearing members 33 and 34, shown as secured in place by bolts 35 although it will be understood that this structure is only illustrative and does not define the limits of the invention. Mounted for rotation on the bearing means 33 and 34 is a hollow elongated body 36. Obviously, the bearings 33 and 34 may contain suitable antifriction means (not shown) for the mounting of the hollow elongated body 36.

Collars 37 and 38 are secured to the hollow elongated body 36 as by set screws 39 and such collars bearing against corresponding faces of the bearing means 33 and 34, serve to hold the elongated body against longitudinal movement in one direction. The space between the collar 38 and the opposed side or face of the bearings means 33 is filled as by a pulley 40, which pulley is secured to the elongated hollow body for rotation therewith as by means of a key 41. Thus, it will be seen that the body 36 is mounted for rotation but is held against axial movement.

Inwardly, the hollow elongated body 36 is provided with axially or longitudinally extending spaced ribs 42 dividing the inner surface of said body axially into sections. As shown, but two of these means or ribs are provided but as the description proceeds, it will become clear that a greater number may be provided when desired. These ribs or dividing means preferably extend from the forward or outer end of the body 36 to a point toward the rear of such body.

The rear portion of such body is internally enlarged whereby it is provided with a shoulder 43 against which abuts the inner end of a head 44 carried by a short stem or neck 45 extending rearwardly through a cap or bonnet 46 threaded on the rear end of the body 36. Head 44 carries packing rings 47 providing a seal between the head and the adjacent inner surfaces of the hollow elongated body 36. Through the head 44 and its neck portion 45, there is a passage 48 with which communicates the passage 49 of a T-fitting 50. Such fitting is shown as threaded onto the outer or rear end portion of the neck 45 and as having its branch 51 connected with a suitable source of supply of a coolant, as through a tube 52.

Extending through the fitting 50 and into the hollow elongated body 36, is a rod 53 which on its inner end rotatably mounts a follower 54 having spaced grooves 55 in its periphery and which grooves receive the ribs 42 whereby the follower will be rotated with the body 36 and whereby its portions at the opposite sides of the grooves 55 conform to the inner surfaces of the above described axial sections of the body 36. Clearly, the follower 54 may be mounted by suitable anti-friction bearings (not shown) and as shown, it is held on a reduced diameter portion of the rod 53 as between a shoulder 56 and a washer 57, the latter being held in place by a key or the like 58, although any other means desired may be employed. In this way, the follower is so mounted that any longitudinal or axial movement of the rod 53 is imparted to the follower and yet the latter is free to rotate relative to said rod.

The rod 53 extends a substantial distance beyond the inner end of fitting 50 and in its rear portion may be guided as by means 60. Suitable means are provided for shifting the rod 53 longitudinally whereby to cause the piston-like follower 54 to shift an abrasive drill 61 forwardly in the hollow elongated body 36. As shown, such means takes the form of a hand lever 62 pivotally anchored to a suitable support 63 as at 64, and intermediate its ends pivoted to the rear end of the rod 53 as at 65. With this construction, it will be clear that on shifting of the forward end of the lever 62 horizontally or on rocking of said lever on its pivot 64, the rod 53 will be moved forwardly or rearwardly with respect to the hollow elongated body 36 and when moved forwardly causes the follower 54 to push forwardly on the rear ends of the sections of the abrasive tube drill 61 whereby the latter will be moved through the open forward end of said hollow elongated body 36. The purpose of this will be set forth.

Water or other coolant supplied to the fitting 50 through the tube 52 must move forwardly through the fitting since a suitable nut 66 maintains a packing 67 about the rod 53 at the rear portion of said fitting. The coolant passes from the fitting through the passage 48 extending through the projection 45 and the body 44 and located about the rod 53. Thus, the coolant enters the hollow elongated body 36 at the rear of the follower 54 and the latter is provided with a multiplicity of holes or openings 69 through which the coolant passes to the forward side thereof and thence over the abrasive tube drill 61 and out through the forward end of the body 36. A drain for the coolant is shown at 68.

The abrasive tube drill 61 is shown as made up of a pair of elongated transversely arcuate bodies or sections 70, one of which is shown more particularly in Fig. 6. Each of these bodies or sections comprises abrasive grains and a suitable bonding medium as rubber, resin, or the like. Body 70 is of uniform or substantially uniform thickness and is provided with straight and parallel or substantially straight and parallel longitudinal edges 71 and 72. The bodies or sections making up the drill 61 are of the same thickness and the same radius of curvature and the two bodies or sections 70 of the drill 61, when arranged with their longitudinal edges in abutment, form a transversely ovaloid rather than a transversely circular structure. That is, each section or body is somewhat less than a semi-cylinder. Each body 70, toward one end, is provided with a perforation 73, the purpose of which will be set forth when considering the modification illustrated in Fig. 5 of the drawings.

An electric motor 74 is mounted on the rear portion of the bed 10 and is provided with a pulley 75 which through a belt 76 drives the pulley 40 keyed or otherwise made fast to the hollow elongated body 36. Thus, whenever the motor 74 is in operation, the hollow elongated body 36 is being rotated and with such body there is rotating the follower 54 on the rod 53 and the cap or bonnet 46 as well as the collars or spacers 37 and 38.

When discs are to be cut from a piece of plate glass or the like 31, the material to be cut is disposed against the wall 30 of the work holder and is clamped in place. Motor 74 is started and the flow of coolant through the tube 52 is also started. Then the operator grasps the lever or handle 62 and shifts the rod 53 forwardly whereby to have the follower 54 engage and press forwardly on the sections 70 of the abrasive tube drill 61.

It will be understood that the tube drill sections are of a degree of curvature whereby to engage the inner surface sections of the body 36 between the ribs 42 of such body with the longitudinal edges 71 and 72 of the sections against the sides of said ribs, all as best shown in Fig. 4. Thus, the abrasive drill is rotated with the body 36 and the motion is imparted to the sections of the drill through the contact between the longitudinal edges of such sections and edges of the ribs 42 of the body. Therefore, driving action is not imparted to the drill at one end but is imparted to the same over a substantial portion of its length and, in fact, over the entire length of the drill remaining within the body 36.

The work being secured against the work holder or to the work holder, as the operator advances the rod 53, drill 61 is advanced to engage the work and is kept against the work with the desired pressure. As the drill is being rotated at high speed, it cuts its way through the work with considerable rapidity although the operator regulates the pressure of the drill against the work through manipulation of the handle 62. He may alternately apply and ease the pressure. The coolant passing through the head 54 floods out through the open end of the drill and into the spaces 77 between the forward ends of the drill sections and through the medium of said spaces may enter into or is carried into the cut being made whereby the material being acted upon is kept relatively cool and is prevented from overheating.

During a cutting or drilling operation, the drill wears down but this is easily compensated for by manipulation of the handle 62. When, as a result of successive operations, the drill has become quite short, the head 54 is withdrawn back into the body 36 and the worn down drill sections or what is left of them are removed from the body and new drill sections inserted. With the described construction, it will be apparent that the only portions of the drill which are not physically held and driven are those extending beyond the forward end of the body 36. Thus, there is little tendency for the drill to twist off as would be the case if the driving action were applied to one end only of the drill and the drill was otherwise unsupported. Since with the present structure the entire drill structure, with the exception of the part actually working, is supported and since the drive is over the entire area of one longitudinal edge of each drill section, it will be seen that there is little, if any, tendency for breakage of the drill under the strain resulting from its use.

In the modification of Fig. 5, many of the parts shown are those previously described, and such parts have been given the reference numbers heretofore used. The modification comprises essentially a structure wherein a single machine is adapted for use with various diameters of abrasive tube drills, thus, in the modification, a hollow elongated body generally designated 78 is substituted for the hollow elongated body 36 of the figures first described. The body 78 is rotatable in the bearings 33 and 34 and is held against longitudinal movement with respect to such bearings as by the collar 38 and pulley 49 and a radial flange 79 shown as integral with the forward end of the body and replacing the collar 37 of the figures first described.

Internally, body 78 is tapered or otherwise formed as at 80 for the reception of an externally tapered hollow elongated body 81 comprising an adaptor. Internally, body 81 is of uniform diameter as is the body 36 and further, body 81 is internally of the same construction as the body 36 in that the body 81 is provided with ribs 82 extending axially thereof. Body 81 may be provided with two or more of the ribs 82 and these ribs correspond with the ribs 42 of the body 36 and in the body 81 function in the same manner that the ribs 42 function in the body 36. Thus, an abrasive drill 61 comprising the pair of sections 70 is inserted into the body 81 as through the forward end thereof with the longitudinal edges of the sections against the longitudinal edges of the axially extending ribs 82 and with the outer curved surfaces of the sections against the curved inner surfaces of the body 81 in the sections of the latter between the ribs 82.

There is a further modification in Fig. 5 in that the follower 54a (corresponding with the follower 54 of the figures first described) is provided with spring arms 83 each provided with an outwardly bent intermediate portion 84. Such portions 84 of the spring arms enter the openings or perforations 73 in the drill sections 70 as in Fig. 5. With the modified construction, as the rod 53 or its equivalent is moved forwardly, the drill 61 is caused to project through the forward end of the hollow elongated body 81 since the follower 54a will serve to push the drill outwardly through the forward end of said body.

However, on reverse movement of the rod 53, owing to the engagement of the spring arm portions 84 in the openings or perforations 73 of the drill sections, the drill is drawn rearwardly or into the body 81. This is a convenience in the use of the machine since after the drill has been projected and has cut its way through a piece of work, it can then be conveniently drawn inwardly or rearwardly out of the work whereby to permit the work to be shifted or removed. When the machine does not include a means attaching the follower to the drill whereby the drill may be withdrawn from the work, it is necessary to lightly pry the drill rearwardly or inwardly of the hollow elongated body to remove it from the work.

In addition to the above, with the structure of the modification, simply by making the hollow elongated body 78 of a relatively large size and providing the purchaser of the machine with a number of the bodies 81 of the same outside tapered configuration but of different wall thicknesses and therefore of different internal diameters, the purchaser is supplied with means whereby in the same machine he may use different diameters of drills. For example, adaptors may be provided to adapt the machine for operation with drills varying in diameter from the smallest to the largest, although generally speaking, the machines would only be adapted to take adaptors over certain ranges as those for the mounting of drills of ½" diameter up to those for the mounting of drills of 1½" diameter. In the various structures disclosed, the diameters may be of considerable length as much as a foot or more and thus the machine once equipped with drills is ready for the performance of a large number of drilling operations.

Each drill would be driven over substantially its entire length regardless of such length and would be protected against all lateral external pressures except those applied to the exposed cutting portion of the drill. There is no tendency for the drill to whip or run out of true or to twist off as is the case with drills mounted and driven only from one end. Where the drills are mounted and driven from one end, there are very definite limitations as to their lengths and wall structures. In the present instance, I can use drills varying in wall thicknesses from .020" to .250".

Actually, with my present machine, there is no reason for making drills under 3" in length and they may be of considerably greater length as up to the length of a foot or more. With the present machine and drill structure, I find that when drilling discs from plate glass and the like, there is no chipping at either end of the cut and, further, the cut and the disc removed are each represented by straight parallel side walls. There is no bell mouthing of the cut. I attribute these advantages to the fact that the drill is carefully held against all but the desired movements.

The passageway between the drill sections represented at 77 in the drawings provides for the escape of loose particles of work and loose abrasive particles and for the free entrance of coolant into the cut to wash such loose particles out of the cut. Thus, the cut is kept clean at all times and adequately cooled. While, in the foregoing description, the drill has been disclosed as comprising a pair of similar sections, it will be understood that the invention is not so limited. A greater number of sections may be used if desired and, in fact, I have effectively used a single section 70 as an abrasive tube drill.

Having thus set forth the nature of my invention, what I claim is:

1. In an abrasive drilling machine, a base, a chuck, means mounting said chuck for rotation on the base, spaced axially extending ribs on the inner surface of said chuck, a tube drill in said chuck and comprising elongated transversely curved sections each located between a pair of said ribs to be driven through their longitudinal edges by the ribs as the chuck is rotated, said sections slidable longitudinally in said chuck between said ribs while said chuck is rotating and carrying said sections with it, a work holder on the base spaced from one end of said chuck, and means for moving said drill through said end of the chuck toward said work holder while said chuck and drill are rotating.

2. For use in an abrasive drilling machine, a hollow body adapted to be rotated, means dividing the inner surface of said body into axially extending sections, a tube drill in said body and comprising elongated sections disposed in the respective axially extending sections of said body, said tube drill sections transversely shaped to be received against the inner surfaces of the respective axially extending sections of the body to be driven through their longitudinal edges by said dividing means when said body is rotated, said drill sections slidable longitudinally in said body between said dividing means while the body is rotating and driving said sections, and means for moving said drill sections through one end of said body while the latter and said drill are rotating.

3. In an abrasive drilling machine, a base, a hollow elongated body, means mounting said body for rotation on the base, means for rotating said body, means dividing the inner surface of said body axially into sections, a tube drill in said body and comprising elongated sections disposed in the respective sections of the body and extending axially of the body, said tube drill sections transversely shaped to be received against the inner surfaces of the respective axially extending sections of the body to be driven through their longitudinal edges by said dividing means when said body is rotated, said drill sections slidable longitudinally in said body between said dividing means while the body is rotating and driving said sections, a work holder on the base spaced from one end of said body, and means for moving said drill through said end of the body toward said work holder while said body and drill are rotating.

4. In an abrasive drilling machine, a base, a hollow elongated body, means mounting said body for rotation on the base, means for rotating said body, ribs dividing the inner surface of said body axially into sections, a tube drill in said body and comprising elongated sections disposed in the respective sections of the body and extending axially thereof, said tube drill sections transversely shaped to be received against the inner surfaces of the respective axially extending sections of the body to be driven through their longitudinal edges by said dividing ribs when said body is rotated, a work holder on the base spaced from one end of said body, a follower in said body at the inner end of said drill, said follower having grooves receiving said ribs whereby the follower is movable axially of the body and is rotatable therewith, and means for moving said follower axially of the body to shift said drill through said end of the body toward said work holder.

5. In an abrasive drilling machine, a base, a hollow elongated body, means mounting said body for rotation on the base, means for rotating said body, ribs dividing the inner surface of said body axially into sections, a tube drill in said body and comprising elongated sections disposed in the respective sections of the body and extending axially thereof, said tube drill sections transversely shaped to be received against the inner surfaces of the respective axially extending sections of the body to be driven through their longitudinal edges by said dividing ribs when said body is rotated, a work holder on the base spaced from one end of said body, a follower in said body at the inner end of said drill, said follower having grooves receiving said ribs whereby the follower is movable axially of the body and is rotatable therewith, a rod entering said body from the end thereof opposite the end thereof toward said work holder, means connecting the follower and rod together for movement axially of said body and for rotation of the follower with the body and relative to said rod, and means outside of said body for moving said rod and thus said follower to shift said drill through said end of the body toward said work holder.

6. In an abrasive drilling machine, a base, a hollow elongated body, means mounting said body for rotation on the base, means for rotating said body, ribs dividing the inner surface of said body axially into sections, a tube drill in said body and comprising elongated sections disposed in the respective sections of the body and extending axially thereof, said tube drill sections transversely shaped to be received against the inner surfaces of the respective axially extending sections of the body to be driven through their longitudinal edges by said dividing ribs when said body is rotated, a work holder on the base spaced from one end of said body, a follower in said body at the inner end of said drill, said follower having grooves receiving said ribs whereby the follower is movable axially of the body and is rotatable therewith, a rod entering said body from the end thereof opposite the end thereof toward said work holder, means connecting the follower and rod together for movement axially of said body and for rotation of the follower with the body and relative to said rod, means outside of said body for moving said rod and thus said follower to shift said drill through said end of the body toward said work holder, and means providing a channel about said rod for the supplying of coolant to the interior of said body.

7. In an abrasive drilling machine, a base, a hollow elongated body, means mounting said body for rotation on the base, means for rotating said body, ribs dividing the inner surface of said body axially into sections, a tube drill in said body and comprising elongated sections disposed in the respective sections of the body and extending axially thereof, said tube drill sections transversely shaped to be received against the inner surfaces of the respective axially extending sections of the body to be driven through their longitudinal edges by said dividing ribs when said body is rotated, a work holder on the base spaced from one end of said body, a follower in said body at the inner end of said drill, said follower having grooves receiving said ribs whereby the follower is movable axially of the body and is rotatable therewith, a rod entering said body from the end thereof opposite the end thereof toward said work holder, means connecting the follower and rod together for movement axially of said body and for rotation of the follower with the body and relative to said rod, means outside of said body for moving said rod and thus said follower to shift said drill through said end of the body toward said work holder, means providing a channel about said rod for the supplying of coolant to the interior of said body, and said follower having an opening therethrough for the passage of coolant therethrough to said end of the body toward said work holder, 8. In an abrasive drilling machine, a base, a hollow elongated body, means mounting said body on the base for rotation, means for rotating said body, a tube drill in the body and engaging the inner surface thereof, means whereby as said body is rotated said drill is rotated with the body, said tube drill movable longitudinally in said body while rotating with the latter, a work holder on the base and spaced from one end of the body, and means for moving said drill through said end of the body toward said work holder while said body and drill are rotating together.

9. In an abrasive drilling machine, a base, a hollow elongated body, means mounting said body on the base for rotation, means for rotating said body, a tube drill in the body and engaging the inner surface thereof, means whereby as said body is rotated said drill is rotated with the body, said tube drill movable longitudinally in the body while rotating with the latter, a work holder on the base and spaced from one end of the body, and means for moving said drill outwardly and inwardly through said end of the body toward and from said work holder while said body and drill are rotating together.

10. In an abrasive drilling machine, a base, a hollow elongated body, means mounting said body for rotation on the base, means for rotating said body, means dividing the inner surface of said body axially into sections, a tube drill in said body and comprising elongated sections disposed in the respective sections of the body and extending axially of the body, said tube drill sections transversely shaped to be received against the inner surfaces of the respective axially extending sections of the body to be driven through their longitudinal edges by said dividing means when said body is rotated, said drill sections slidable longitudinally in said body between said dividing means while the body and drill sections are rotating, a work holder on the base spaced from one end of said body, and means for moving said drill outwardly and inwardly through said end of the body toward and from said work holder while said body and drill are rotating together.

11. In an abrasive drilling machine, a base, a hollow elongated body, means mounting said body for rotation on the base, means for rotating said body, ribs dividing the inner surface of said body axially into sections, a tube drill in said body and comprising elongated sections disposed in the respective sections of the body and extending axially of the body, said tube drill sections transversely shaped to be received against the inner surfaces of the respective axially extending sections of the body to be driven through their longitudinal edges by said driving ribs when said body is rotated, said drill sections slidable longitudinally in said body between said dividing ribs while the body and drill sections are rotating, a work holder on the base spaced from one end of said body, a follower in said body at the inner end of said drill, said follower having grooves receiving said ribs whereby the follower is movable axially of the body and is rotatable therewith, means connecting said follower with each of the sections of said tube drill, and means for moving said follower axially of the body to shift said tube drill outwardly and inwardly through the end of the body toward said work holder while the body and drill are rotating together.

12. In an abrasive drilling machine, a base, a hollow elongated body, means mounting said body on the base for rotation, means for rotating said body, a tube drill in the body and engaging the inner surface thereof, means whereby as said body is rotated said drill is rotated, said drill slidable longitudinally in said body while said tube drill and body are rotating together, a work holder on the base and spaced from one end of the body, a follower in the body at the inner end of said tube drill and movable axially of the body and rotatable therewith, and means for shifting said follower axially of said body to push said tube drill outwardly through the end of the body from which said work holder is spaced while said body and tube drill are rotating together.

13. In an abrasive drilling machine, a base, a hollow elongated body, means mounting said body on the base for rotation, means for rotating said body, a tube drill in the body and engaging the inner surface thereof, means whereby as said body is rotated said drill is rotated, a work holder on the base and spaced from one end of the body, a follower in the body at the inner end of said tube drill and movable axially of the body and rotatable therewith, means connecting said follower with said tube drill, and means for moving said follower axially of the body to shift said tube drill outwardly and inwardly through the end of the body toward said work holder.

14. In an abrasive drilling machine, a base, a hollow elongated body open through one of its ends, means mounting said body for rotation on the base, a second hollow elongated body at least partially receivable in the first mentioned body to be rotated therewith, means dividing the inner surface of the second mentioned body axially into sections, a tube drill in the second body and comprising elongated sections disposed in the respective sections thereof and extending axially thereof, said tube drill sections transversely shaped to be received against the inner surfaces of the respective axially extending sections of the second body to be driven through their longitudinal edges by said dividing means when the second body is rotated by the first mentioned body, a work holder on said base and spaced from one end of the second body, and means for moving said drill through such end of the body toward said work holder.

15. In an abrasive drilling machine, a base, a hollow elongated body open through one of its ends, means mounting said body for rotation on the base, a second hollow elongated body and at least partially receivable in the taper of the first mentioned body to be rotated therewith, means dividing the inner surface of the second body axially into sections, a tube drill in the second body and comprising elongated sections disposed in the respective sections thereof and extending axially thereof, said tube drill sections transversely shaped to be received against the inner surfaces of the respective axially extending sections of the second body to be driven through their longitudinal edges by said dividing means when the second body is rotated by the first mentioned body, a work holder on said base and spaced from one end of the second body, a follower in the second body inwardly of said tube drill sections, means connecting said follower with each of the sections of said tube drill, and means for moving said follower axially of the body to shift said tube drill outwardly and inwardly through the end of the body toward said work holder.

16. An abrasive tube drill comprising an elongated transversely arcuate body of abrasive grains and a bonding medium for said grains, said body between twenty and two hundred and fifty thousandths of an inch in thickness and of substantially uniform thickness over its entire area and having substantially straight and substantially parallel longitudinal edges, and said section having a recess therein opening through an arcuate surface thereof and toward one of its transverse ends.

17. In an abrasive drilling machine, a base, a hollow elongated body, means mounting said body on the base for rotation, means for rotating said body, means dividing the inner surface of said body axially into sections, a tube drill in said body and comprising elongated sections disposed in the respective sections of the body and extending axially of the body, said tube drill sections transversely shaped to be received against the inner surfaces of the respective axially extending sections of the body to be driven through their longitudinal edges by said dividing means when said body is rotated, a work holder on the base and spaced from one end of said body, a follower in the body at the inner end of said tube drill sections and movable axially of the body and rotatable therewith, means connecting said follower with each of the sections of said tube drill, and means for moving said follower axially of the body to shift said tube drill outwardly and inwardly through the end of the body toward said work holder.

HUGH V. ALLISON.

REFERENCES CITED

The following references are of record in the file of this patent:

UNITED STATES PATENTS

| Number | Name | Date |
|--------|------|------|
| 850,033 | Miller | Apr. 9, 1907 |
| 1,081,836 | Jordan | Dec. 16, 1913 |
| 1,641,799 | Brandes et al. | Sept. 6, 1927 |
| 1,868,492 | Bucheister | July 26, 1932 |
| 2,231,516 | Wennberg | Feb. 11, 1941 |
| 2,413,084 | Sommer et al. | Dec. 24, 1946 |